United States Patent
Newman et al.

(10) Patent No.: US 7,698,245 B2
(45) Date of Patent: Apr. 13, 2010

(54) APPLYING RULES TO VALIDATING DATA FOR A MACHINE ARRANGEMENT

(75) Inventors: Eric Newman, Brighton, MI (US);
Joseph Walacavage, Ypsilanti, MI (US);
Earl Dishaw, New Boston, MI (US);
James McAlpine, Northville, MI (US)

(73) Assignee: Ford Motor Company, Dearborn, MI (US)

( * ) Notice: Subject to any disclaimer, the term of this patent is extended or adjusted under 35 U.S.C. 154(b) by 661 days.

(21) Appl. No.: 11/685,859

(22) Filed: Mar. 14, 2007

(65) Prior Publication Data
US 2008/0133031 A1 Jun. 5, 2008

Related U.S. Application Data

(60) Provisional application No. 60/867,985, filed on Nov. 30, 2006, provisional application No. 60/883,231, filed on Jan. 3, 2007.

(51) Int. Cl.
*G06F 17/00* (2006.01)
*G06N 5/02* (2006.01)
(52) U.S. Cl. .................................................... 706/47
(58) Field of Classification Search ............... 228/45; 358/1.18; 707/10, 1; 705/10; 706/47
See application file for complete search history.

(56) References Cited

U.S. PATENT DOCUMENTS

| | | | | |
|---|---|---|---|---|
| 4,838,473 A | * | 6/1989 | Schreiber et al. | 228/45 |
| 6,442,441 B1 | | 8/2002 | Walacavage et al. | |
| 2006/0224434 A1 | * | 10/2006 | Rumi et al. | 705/10 |

OTHER PUBLICATIONS

Entrekin, David A., "Factory Automation and Data collection", National Computer Conference, 1973 pp. 1-5.*

* cited by examiner

*Primary Examiner*—Donald Sparks
*Assistant Examiner*—Ola Olude-Afolabi
(74) *Attorney, Agent, or Firm*—Raymond L. Coppiellie; Brooks Kushman P.C.

(57) ABSTRACT

A system and method for validating data for a machine arrangement includes a controller, such as a programmable logic controller, connected to a processor, which is configured to execute an algorithm using the data collected by the controller. The algorithm includes one or more rules that are applicable to the collected data. Each rule is applied to the data to determine if any of the data entries violate one or more of the rules. An output is generated indicating whether the data violates any of the rules, thereby providing information regarding the validity of the data being captured.

24 Claims, 6 Drawing Sheets

Fig. 3

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|---|---|---|---|---|---|---|---|---|---|---|---|---|---|---|
| 1590 | 7500 | 198 | 0 | 0 | 0 | 195 | 853 | 0 | 0 | 1973 | 0 | 9 | 0 | 0 | 0 | 0 | 0 | 0 | 0 | 155 | 1887 | 0 | 32001 | 0 | 0 | 0 | 0 | 0 | 0 | 0 | 0 | 16:00:47 | 1/27/2007 | 132 |
| 1591 | 7500 | 198 | 0 | 0 | 0 | 195 | 853 | 0 | 0 | 1973 | 0 | 9 | 0 | 0 | 0 | 0 | 0 | 0 | 0 | 155 | 1887 | 0 | 32001 | 0 | 0 | 0 | 0 | 0 | 0 | 0 | 0 | 16:01:48 | 1/27/2007 | 132 |
| 1592 | 7500 | 198 | 0 | 0 | 0 | 195 | 853 | 0 | 0 | 1973 | 0 | 9 | 0 | 0 | 0 | 0 | 0 | 0 | 0 | 155 | 1887 | 0 | 32001 | 0 | 0 | 0 | 0 | 0 | 0 | 0 | 0 | 16:02:46 | 1/27/2007 | 132 |
| 1593 | 7500 | 198 | 0 | 0 | 0 | 195 | 853 | 0 | 0 | 1973 | 0 | 9 | 0 | 0 | 0 | 0 | 0 | 0 | 0 | 155 | 1887 | 0 | 32001 | 0 | 0 | 0 | 0 | 0 | 0 | 0 | 0 | 16:03:47 | 1/27/2007 | 132 |
| 1594 | 7500 | 198 | 0 | 0 | 0 | 195 | 853 | 0 | 0 | 1973 | 0 | 9 | 0 | 0 | 0 | 0 | 0 | 0 | 0 | 155 | 1887 | 0 | 32001 | 0 | 0 | 0 | 0 | 0 | 0 | 0 | 0 | 16:04:48 | 1/27/2007 | 132 |
| 1595 | 7500 | 198 | 0 | 256 | 0 | 195 | 853 | 0 | 0 | 1973 | 0 | 9 | 0 | 0 | 0 | 363 | 0 | 0 | 363 | 155 | 1887 | 0 | 32001 | 0 | 0 | 0 | 0 | 0 | 0 | 0 | 0 | 16:05:02 | 1/27/2007 | 132 |
| 1596 | 7500 | 198 | 0 | 256 | 0 | 195 | 853 | 0 | 0 | 1973 | 0 | 9 | 0 | 0 | 0 | 363 | 0 | 0 | 363 | 13 | 1887 | 0 | 32001 | 0 | 0 | 0 | 0 | 0 | 0 | 0 | 0 | 16:05:02 | 1/27/2007 | 132 |
| 1597 | 7500 | 198 | 0 | 256 | 0 | 195 | 853 | 0 | 0 | 1973 | 0 | 9 | 0 | 0 | 0 | 363 | 0 | 0 | 363 | 155 | 1887 | 0 | 32001 | 0 | 0 | 0 | 0 | 0 | 0 | 0 | 0 | 16:05:04 | 1/27/2007 | 132 |
| 1598 | 7500 | 198 | 0 | 256 | 0 | 195 | 853 | 0 | 0 | 1973 | 0 | 9 | 0 | 0 | 0 | 363 | 0 | 0 | 365 | 13 | 1887 | 0 | 32001 | 0 | 0 | 0 | 0 | 0 | 0 | 0 | 0 | 16:05:06 | 1/27/2007 | 132 |
| 1599 | 7500 | 198 | 0 | 256 | 0 | 195 | 853 | 0 | 0 | 1973 | 0 | 9 | 0 | 0 | 0 | 363 | 0 | 0 | 365 | 155 | 1887 | 0 | 32001 | 0 | 0 | 0 | 0 | 0 | 0 | 0 | 0 | 16:05:08 | 1/27/2007 | 132 |
| 1600 | 7500 | 198 | 0 | 256 | 0 | 195 | 853 | 0 | 0 | 1973 | 0 | 9 | 0 | 0 | 0 | 363 | 0 | 0 | 363 | 13 | 1887 | 0 | 32001 | 0 | 0 | 0 | 0 | 0 | 0 | 0 | 0 | 16:05:10 | 1/27/2007 | 132 |
| 1601 | 7500 | 198 | 0 | 256 | 0 | 195 | 853 | 0 | 0 | 1973 | 0 | 9 | 0 | 0 | 0 | 363 | 0 | 0 | 365 | 155 | 1887 | 0 | 32001 | 0 | 0 | 0 | 0 | 0 | 0 | 0 | 0 | 16:05:12 | 1/27/2007 | 132 |
| 1602 | 7500 | 198 | 0 | 256 | 0 | 195 | 853 | 0 | 0 | 1973 | 0 | 9 | 0 | 0 | 0 | 363 | 0 | 0 | 363 | 13 | 1887 | 0 | 32001 | 0 | 0 | 0 | 0 | 0 | 0 | 0 | 0 | 16:05:14 | 1/27/2007 | 132 |
| 1603 | 7500 | 198 | 0 | 256 | 0 | 195 | 853 | 0 | 0 | 1973 | 0 | 9 | 0 | 0 | 0 | 363 | 0 | 0 | 365 | 155 | 1887 | 0 | 32001 | 0 | 0 | 0 | 0 | 0 | 0 | 0 | 0 | 16:05:16 | 1/27/2007 | 132 |
| 1604 | 7500 | 198 | 0 | 256 | 0 | 195 | 853 | 0 | 0 | 1973 | 0 | 9 | 0 | 0 | 0 | 363 | 0 | 0 | 365 | 13 | 1887 | 0 | 32001 | 0 | 0 | 0 | 0 | 0 | 0 | 0 | 0 | 16:05:18 | 1/27/2007 | 132 |
| 1605 | 7500 | 198 | 0 | 256 | 0 | 195 | 853 | 0 | 0 | 1973 | 0 | 9 | 0 | 0 | 0 | 363 | 0 | 0 | 363 | 155 | 1887 | 0 | 32001 | 0 | 0 | 0 | 0 | 0 | 0 | 0 | 0 | 16:05:20 | 1/27/2007 | 132 |
| 1606 | 7500 | 198 | 0 | 256 | 0 | 195 | 853 | 0 | 0 | 1973 | 0 | 9 | 0 | 0 | 0 | 363 | 0 | 0 | 365 | 13 | 1887 | 0 | 32001 | 0 | 0 | 0 | 0 | 0 | 0 | 0 | 0 | 16:05:22 | 1/27/2007 | 132 |
| 1607 | 7500 | 198 | 0 | 256 | 0 | 195 | 853 | 0 | 0 | 1973 | 0 | 9 | 0 | 0 | 0 | 363 | 0 | 0 | 363 | 155 | 1887 | 0 | 32001 | 0 | 0 | 0 | 0 | 0 | 0 | 0 | 0 | 16:05:24 | 1/27/2007 | 132 |
| 1608 | 7500 | 198 | 0 | 256 | 0 | 195 | 853 | 0 | 0 | 1973 | 0 | 9 | 0 | 0 | 0 | 363 | 0 | 0 | 365 | 13 | 1887 | 0 | 32001 | 0 | 0 | 0 | 0 | 0 | 0 | 0 | 0 | 16:05:26 | 1/27/2007 | 132 |
| 1609 | 7500 | 198 | 0 | 256 | 0 | 195 | 853 | 0 | 0 | 1973 | 0 | 9 | 0 | 0 | 0 | 363 | 0 | 0 | 363 | 155 | 1887 | 0 | 32001 | 0 | 0 | 0 | 0 | 0 | 0 | 0 | 0 | 16:05:28 | 1/27/2007 | 132 |
| 1610 | 7500 | 198 | 0 | 256 | 0 | 195 | 853 | 0 | 0 | 1973 | 0 | 9 | 0 | 0 | 0 | 363 | 0 | 0 | 365 | 13 | 1887 | 0 | 32001 | 0 | 0 | 0 | 0 | 0 | 0 | 0 | 0 | 16:05:30 | 1/27/2007 | 132 |
| 1611 | 7500 | 198 | 0 | 256 | 0 | 195 | 853 | 0 | 0 | 1973 | 0 | 9 | 0 | 0 | 0 | 363 | 0 | 0 | 363 | 155 | 1887 | 0 | 32001 | 0 | 0 | 0 | 0 | 0 | 0 | 0 | 0 | 16:05:32 | 1/27/2007 | 132 |
| 1612 | 7500 | 198 | 0 | 256 | 0 | 195 | 853 | 0 | 0 | 1973 | 0 | 9 | 0 | 0 | 1 | 363 | 0 | 0 | 365 | 13 | 1887 | 0 | 32001 | 0 | 0 | 0 | 0 | 0 | 0 | 0 | 0 | 16:05:34 | 1/27/2007 | 132 |
| 1613 | 7500 | 198 | 0 | 256 | 0 | 195 | 853 | 0 | 0 | 1973 | 0 | 9 | 0 | 0 | 0 | 363 | 0 | 0 | 363 | 155 | 1887 | 0 | 32001 | 0 | 0 | 0 | 0 | 0 | 0 | 0 | 0 | 16:05:37 | 1/27/2007 | 132 |
| 1614 | 7500 | 198 | 0 | 256 | 0 | 195 | 853 | 0 | 0 | 1973 | 0 | 9 | 0 | 0 | 0 | 363 | 0 | 0 | 365 | 13 | 1887 | 0 | 32001 | 0 | 0 | 0 | 0 | 0 | 0 | 0 | 0 | 16:05:39 | 1/27/2007 | 132 |
| 1615 | 7500 | 198 | 0 | 256 | 0 | 195 | 853 | 0 | 0 | 1973 | 0 | 9 | 0 | 0 | 0 | 363 | 0 | 0 | 363 | 155 | 1887 | 0 | 32001 | 0 | 0 | 0 | 0 | 0 | 0 | 0 | 0 | 16:05:41 | 1/27/2007 | 132 |
| 1616 | 7500 | 198 | 0 | 256 | 0 | 195 | 853 | 0 | 0 | 1973 | 0 | 9 | 0 | 0 | 0 | 363 | 0 | 0 | 365 | 13 | 1887 | 0 | 32001 | 0 | 0 | 0 | 0 | 0 | 0 | 0 | 0 | 16:05:43 | 1/27/2007 | 132 |
| 1617 | 7500 | 198 | 0 | 256 | 0 | 195 | 853 | 0 | 0 | 1973 | 0 | 9 | 0 | 0 | 0 | 363 | 0 | 0 | 363 | 155 | 1887 | 0 | 32001 | 0 | 0 | 0 | 0 | 0 | 0 | 0 | 0 | 16:05:45 | 1/27/2007 | 132 |
| 1618 | 7500 | 198 | 0 | 256 | 0 | 195 | 853 | 0 | 0 | 1973 | 0 | 9 | 0 | 0 | 0 | 363 | 0 | 0 | 365 | 13 | 1887 | 0 | 32001 | 0 | 0 | 0 | 0 | 0 | 0 | 0 | 0 | 16:05:47 | 1/27/2007 | 132 |
| 1619 | 7500 | 198 | 0 | 256 | 0 | 195 | 853 | 0 | 0 | 1973 | 0 | 9 | 0 | 0 | 0 | 363 | 0 | 0 | 363 | 155 | 1887 | 0 | 32001 | 0 | 0 | 0 | 0 | 0 | 0 | 0 | 0 | 16:05:49 | 1/27/2007 | 132 |
| 1620 | 7500 | 198 | 0 | 256 | 0 | 195 | 853 | 0 | 0 | 1973 | 0 | 9 | 0 | 0 | 0 | 363 | 0 | 0 | 365 | 13 | 1887 | 0 | 32001 | 0 | 0 | 0 | 0 | 0 | 0 | 0 | 0 | 16:05:51 | 1/27/2007 | 132 |
| 1621 | 7500 | 198 | 0 | 256 | 0 | 195 | 853 | 0 | 0 | 1973 | 0 | 9 | 0 | 0 | 0 | 363 | 0 | 0 | 363 | 155 | 1887 | 0 | 32001 | 0 | 0 | 0 | 0 | 0 | 0 | 0 | 0 | 16:05:53 | 1/27/2007 | 132 |
| 1622 | 7500 | 198 | 0 | 256 | 0 | 195 | 853 | 0 | 0 | 1973 | 0 | 9 | 0 | 0 | 0 | 363 | 0 | 0 | 365 | 13 | 1887 | 0 | 32001 | 0 | 0 | 0 | 0 | 0 | 0 | 0 | 0 | 16:05:55 | 1/27/2007 | 132 |
| 1623 | 7500 | 198 | 0 | 256 | 0 | 195 | 853 | 0 | 0 | 1973 | 0 | 9 | 0 | 0 | 0 | 363 | 0 | 0 | 363 | 155 | 1887 | 0 | 32001 | 0 | 0 | 0 | 0 | 0 | 0 | 0 | 0 | 16:05:57 | 1/27/2007 | 132 |

| POS. | LABEL |
|---|---|
| 1 | Transaction Counter |
| 2 | Data Source ID |
| 3 | Message Type |
| 4 | Cycle Type |
| 5 | Equipment Status |
| 6 | QAS/FPS Buttons |
| 7 | Station Cycle Time |
| 8 | Transfer/Index Cycle Time |
| 9 | Good Cycles |
| 10 | Bad Cycles |
| 11 | Total Cycles |
| 12 | Pallet # |
| 13 | Model Code |
| 14 | CID/Rotation/VIN |
| 15 | CID/Rotation/VIN |
| 16 | Fault Word #1 - Machine Fault |
| 17 | Fault Word #2 - Manual Intervention Fault |
| 18 | Standard Warning #1 |
| 19 | Custom Warning #2 |
| 20 | Fault Word #3 - Real Time Fault |
| 21 | Process Control Board |
| 22 | Robot 1 Cycle Time |
| 23 | Robot 2 Cycle Time |
| 24 | Robot 3 Cycle Time |
| 25 | Robot 4 Cycle Time |
| 26 | Robot 5 Cycle Time |
| 27 | Robot 6 Cycle Time |
| 28 | Operator 1 Cycle Time |
| 29 | Operator 2 Cycle Time |
| 30 | Robot/Operator Status |
| 31 | Line Bits Starved/Blocked/Auto |
| 32 | Buffer Count |
| 33 | Time |
| 34 | Date |
| 35 | Capture Cycles |

Fig. 4

Cycle Based Analysis

| | | |
|---|---|---|
| Total Records | Total Cycles | 3195 |
| Station Cycle Times | Cycle Time is zero | 3195 |
| | Station cycle is zero but index or robot non zero | 0 |
| | Time is the same 5 times in a row | 3191 |
| | Out of range (low = 100 and high = 6000) | 0 |
| Index Time | Is zero when station cycle is not zero | 3195 |
| | Is the same as the previous index | 0 |
| | Out of range (low = 400 and high = 8000) | 0 |
| Robot Cycle Times | Robot 1 out of range (low = 100 and high = 8000) | 0 |
| | Robot 2 out of range | 0 |
| | Robot 3 out of range | 0 |
| | Robot 4 out of range | 0 |
| | Robot 5 out of range | 0 |
| | Robot 6 out of range | 0 |
| | Robot 7 out of range | 0 |
| | Robot 8 out of range | 0 |
| | Robot 1 time same too many times in a row | 0 |
| | Robot 2 time same too many times in a row | 0 |
| | Robot 3 time same too many times in a row | 0 |
| | Robot 4 time same too many times in a row | 0 |
| | Robot 5 time same too many times in a row | 0 |
| | Robot 6 time same too many times in a row | 0 |
| | Robot 7 time same too many times in a row | 0 |
| | Robot 8 time same too many times in a row | 0 |
| Faults | Number of Machine Faults | 0 |
| | Number of Manual Interventions | 0 |
| Good Cycle Counter | Improper rollover at 9999 (violations) | 2407 |
| No Part Rule | Hit end of cycle and Model equals 9 | 2960 |
| Models | 9 | 235 |
| | 1 | |

Transaction Based Analysis

| | | |
|---|---|---|
| Total Records | Total Valid Records | 561855 |
| | Records Ignored (due to RSLinx) | 0 |
| | Skipped Transactions | 6 |
| | Improper rollover from 9999 to 0 | 111 |
| Transaction Counter | Counter changed but data did no (<58 sec) | 5622 |
| | Data changed but counter did not | 56047 |
| | Counter changed due to 60 seconds of inactivity (58 to 62 sec) | 35 |
| | No Communications (>=90 sec) | 0 |
| Data Source | Constant | Yes 357 |
| Message Type | Constant | Yes 202 |
| Machine faults | out of range (0..999) | 0 |
| | fault bit set but no data | 0 |
| | data but fault bit not set | 0 |
| Manual Interventions | out of range (0..999) | 0 |
| | fault bit set but no data | 45327 |
| | data but fault bit not set | 0 |
| Models | 1 | 141414 |
| | 9 | 420368 |
| | 51 | 73 |
| 1 Seconds or less | Starved | 0 |
| | Blocked | 0 |
| Empty Aux | Empty Aux | 0 |
| | Empty Aux and Faulted | 0 |
| | Empty Aux and Starved | 0 |

Fig. 5

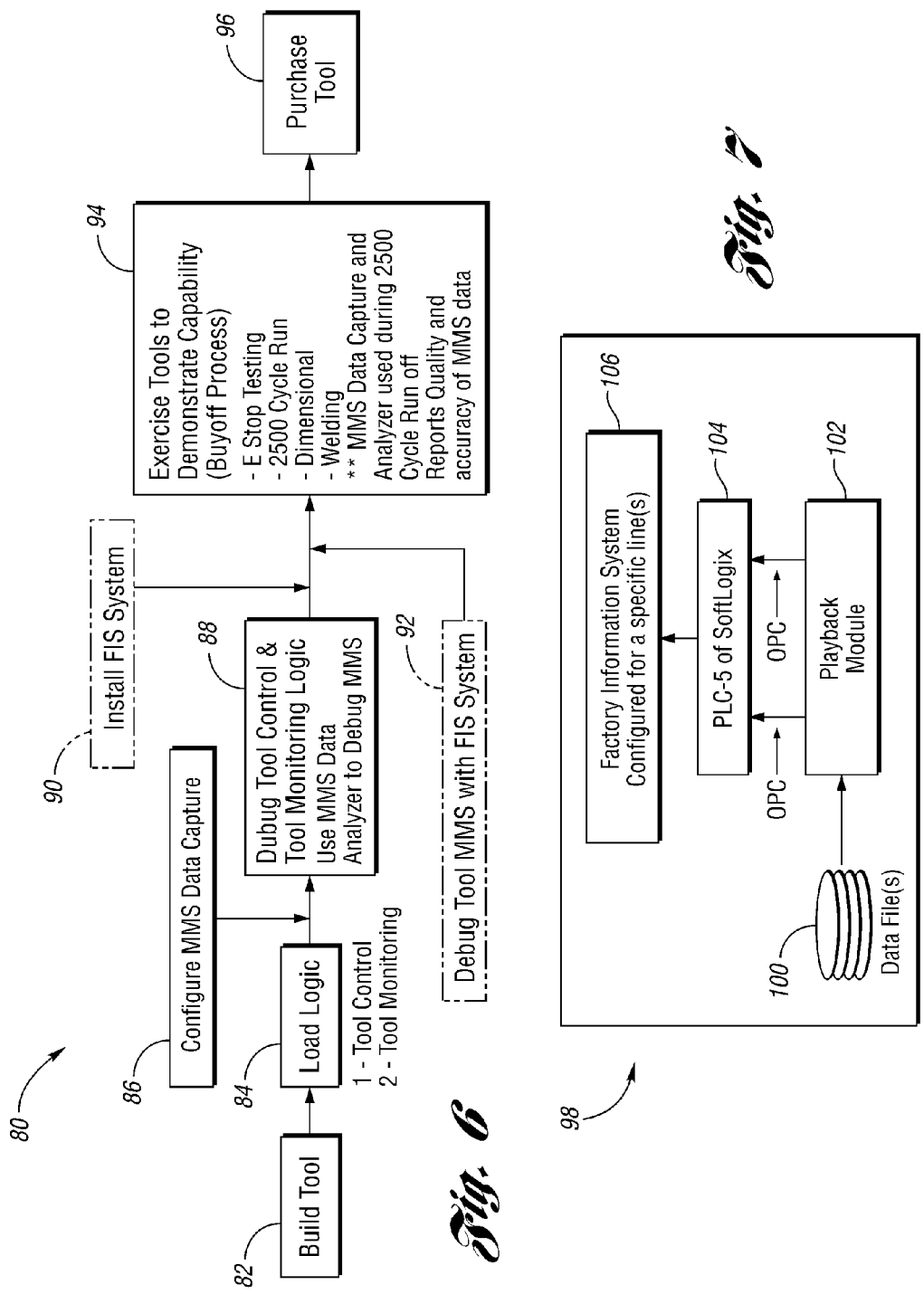

APPLYING RULES TO VALIDATING DATA FOR A MACHINE ARRANGEMENT

CROSS-REFERENCE TO RELATED APPLICATIONS

This application claims the benefit of U.S. provisional application Ser. No. 60/867,985 filed 30 Nov. 2006, and U.S. provisional application Ser. No. 60/883,231 filed 3 Jan. 2007, each of which is hereby incorporated herein by reference.

BACKGROUND OF THE INVENTION

1. Field of the Invention

The present invention relates to a system and method for validating data for a machine.

2. Background Art

Machine monitoring is a process by which a controller controlling a machine—e.g., a programmable logic controller (PLC) controlling a machine tool in a production facility—runs a program to automatically report the performance status of that machine. This reporting may be in the form of a transfer of information in standardized data blocks to a machine management system, such as a factory information system (FIS). Machine monitoring systems (MMS's) can provide important information about the condition of a machine on a plant floor. Examples of such information include: the number of units produced in a given time period, process cycle times, error conditions, machine failure conditions, blockages, etc. Based on this information, plant personnel can make educated decisions about resource allocations, production levels, and resolution of machine stoppages. The system is, however, only valuable if the information being provided is accurate. When the information is inaccurate, the system cannot be used to its full potential, causing inefficient work practices and decision making.

In order to determine the validity of the data captured in an MMS, an individual, such as a subject matter expert, may review thousands of pieces of information to determine anomalies in the data that may indicate that some of the data is inaccurate. Such a subject matter expert may learn to identify these anomalies only after years of training and experience. Moreover, regardless of the level of training and experience of a particular individual, the sheer quantity of data generated in a large scale production facility may be impossible to completely review. This can lead to data inaccuracies being missed, inaccurate data being erroneously assumed to be accurate, and a loss of confidence in the data by decision-making personnel.

As an example of the amount of data that may need to be reviewed, consider that if one machine on one assembly line generates 4000-5000 blocks of data per day, and each block of data consists of 32 status registers denoting the status of the machine at any given time, approximately 150,000 data entries will be generated, and will need to be reviewed. It is worth noting that the approximately 150,000 data entries represent only one machine on one assembly line. In a particular facility, there may be dozens of assembly lines, each consisting of 5-10 machines. Thus, for a single production facility for a single day, there may be tens of millions of data entries generated that need to be reviewed for accuracy by a subject matter expert.

As a practical matter, the subject matter expert cannot handle such an overwhelming amount of data, and is therefore required to limit the focus to a single area. Moreover, logistical considerations present limitations on this type of analysis—i.e., there are far more production facilities and machines than there are subject matter experts to cover them. Thus, the current state of the art requires a labor and time intensive effort executed by a few highly trained individuals who, despite their skills, are limited in the amount of data they can validate.

Therefore, a need exists for a system and method for validating data for a machine that takes advantage of electronic processing speed and the knowledge and skill of subject matter experts to quickly and accurately analyze large quantities of data to determine their validity. This, in turn, will allow an FIS or other machine management system to perform its tasks with some assurance that the data on which it is basing its decisions are accurate.

One of the applications where a subject matter expert may be used to review machine monitoring data is prior to a particular machine being implemented in a production setting. For example, a subject matter expert may visit the machine builder prior to a new machine being certified for delivery to a production facility. In this environment, the machine may be operated by itself, or in conjunction with other machines as part of a work cell or assembly line, and machine monitoring data gathered during this preproduction operation. The subject matter expert can then review and analyze the recorded data to determine its accuracy. Once the machine has passed any required certification test, and the subject matter expert has determined that it is providing accurate machine monitoring data, it may then be shipped to a customer for use in a production facility.

As discussed above, the machine monitoring data may be sent to an FIS to use the data to generate reports on which management decisions can be based. Unfortunately, setting up the interface between the MMS and the FIS often requires interruption of the machine data validation and machine certification at the machine builder. In a practical sense, this requires the FIS to be temporarily installed onsite at the machine builder's location to fine tune the interface between the MMS and the FIS. This process is costly, time consuming, and disruptive to the testing required of the newly built machine.

Therefore, it would be desirable to have a system and method for validating data for a machine that also facilitates recordation of machine data that can later be output to an FIS at an offsite facility. For example, it would be desirable to prepare the interface between the MMS and the FIS at the production facility where the FIS will be permanently installed. This would avoid the undesirable extra steps of moving the FIS to the machine builder's location and disrupting the other testing on the newly built machine.

SUMMARY OF THE INVENTION

Accordingly, the present invention provides a system and method for validating data for a machine using an algorithm executable by an electronic processor that can process large quantities of data and determine its validity based on the algorithm.

Embodiments of the invention include a machine monitoring data mining and analysis engine that utilizes control simulation tools to capture real time machine monitoring data for analysis. The analysis engine is based on data rules that can identify patterns expected in good data sets, and that can be programmed into an electronic processor for speed and accuracy of application.

Embodiments of the invention also provide a system and method for validating data for a machine wherein an output is generated indicating the validity of the machine management data. The machine monitoring data is recorded, and is then output to a machine management system, such as an FIS, so that operation of the machine can be simulated. This allows the data exchange interface between the MMS and the FIS to be developed without requiring the FIS to be installed at the location of the machine. The FIS can then generate its own output, which can be compared to the previously recorded output to verify the accuracy of the interaction between the MMS and FIS.

Embodiments of the invention also include a method for validating data for a machine arrangement using a data collection and analysis system including a controller operatively connected to the machine arrangement and configured to output data related to operation of the machine arrangement. The data collection and analysis system further includes a processing arrangement having a processor and a memory, and which is programmed with an algorithm that includes a plurality of rules for determining validity of the data output from the controller. The method includes operating the machine arrangement, and capturing data from the controller during the machine arrangement operation.

The captured data includes a plurality of registers, each of which is filled at predetermined time intervals with data related to operation of the machine arrangement. This generates a data set that is indicative of the machine arrangement operation over time, and which includes a plurality of data entries for each register. Each of the entries is associated with a certain time during the machine arrangement operation. An algorithm is executed from the processing arrangement using at least some of the captured data to determine validity of the data captured. The algorithm includes at least one of the following steps: applying a first rule to at least two of the data entries in a single register to determine if the data in the single register violate the first rule, or applying a second rule to data entries associated with the same time of the machine arrangement operation for at least two different registers to determine if the data in the at least two registers violate the second rule. The method also includes the step of indicating that at least some of the data in the data set is invalid when at least one of the rules is violated.

Embodiments of the invention also include a system for validating data for a machine arrangement. The system includes a controller operatively connected to the machine arrangement and configured to output data at predetermined time intervals related to operation of the machine arrangement. A processing arrangement is operatively connected to the controller, and includes a processor and a memory. The processing arrangement is configured to receive into the memory data output from the controller. The data received is arranged into a plurality of registers, each of which includes data entries associated with different machine arrangement operation times. This forms a data set that is indicative of the machine arrangement operation over time, and which has a plurality of data entries for each register.

The processor is programmed with an executable algorithm for determining validity of the data output from the controller. The algorithm includes at least one of a first rule or a second rule. The first rule is applicable to at least two of the data entries in a single one of the registers to determine if the data in the single register violate the first rule. The second rule is applicable to data entries associated with the same time of the machine operation for at least two different registers to determine if the data in the at least two registers violate the second rule. The processing arrangement is further configured to provide output indicating that at least some of the data in the data set is invalid when at least one of the rules is violated.

BRIEF DESCRIPTION OF THE DRAWINGS

FIG. 3 is a data table illustrating an example of data captured by the system shown in FIGS. 1 and 2;

FIG. 4 is a chart illustrating the labels for each of the columns in the data table shown in FIG. 3;

FIG. 5 is a detailed view of output generated by the system shown in FIGS. 1 and 2;

FIG. 6 is a flow chart illustrating application of the present invention to a machine tool build and certification; and FIG. 7 is a schematic diagram illustrating how embodiments of the present invention can be used to simulate machine operation in a factory information system that is remote in time and location from the machine operation.

DETAILED DESCRIPTION OF EMBODIMENTS OF THE INVENTION

Figure 1:
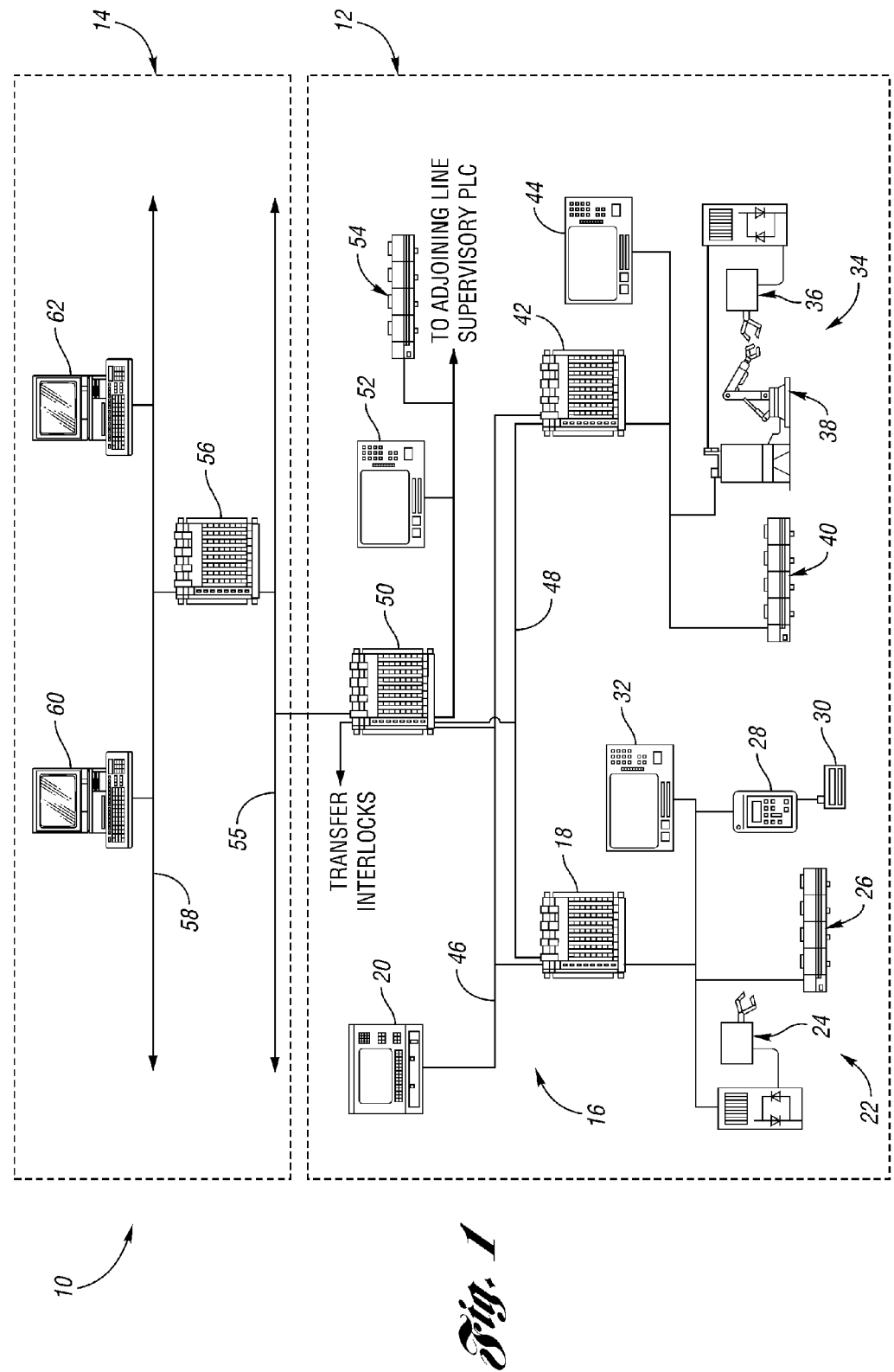
FIG. 1 is a schematic diagram illustrating machine monitoring system architecture, including a system for validating data in accordance with embodiments of the present invention.

FIG. 1 shows machine monitoring system architecture 10 for a production facility having a number of production machines. The architecture 10 is generally divided into a tooling level 12 and a data collection level 14. The data collection level 14 generally represents a machine management system, or factory information system (FIS) such as is used in large production facilities. At the tooling level 12, there is a system 16 in accordance with one embodiment of the present invention. The system 16 can be used to validate data related to the operation of a machine arrangement. As used herein, the term "machine arrangement" may include one or more machine tools, such as welders, robots, cutting machines, stamping machines, and the like, other types of machines, such as ovens, paint booths, and conveyors, as well as various equipment associated with the operation of the machine.

The system 16 shown in FIG. 1 includes a controller 18, which is a programmable logic controller (PLC) and a processing arrangement 20 operatively connected to the PLC 18. The PLC 18 is operatively connected to a machine arrangement 22 that includes a welder 24, a block of input/output devices 26—which may include such things as tooling, sensors, and actuators—a motor controller 28, a motor 30, and an input/output panel 32 that may be used by a machine operator.

A second machine arrangement 34 also includes a welder 36, and further includes a robot 38, a bank of input/output devices 40, a PLC 42, and an input/output panel 44. As shown in FIG. 1, the various controllers, machines, and processing units are connected via a number of networks. For example, the processing arrangement 20 is connected to the PLC's 18, 42 via a programming network 46. Similarly, the PLC's 18, 42 are connected to each other through a station interlock network 48. Also connected via both of these networks 46, 48 is a line supervisory PLC 50, an input/output panel 52, and a bank of input/output devices 54.

As shown in FIG. 1, the station interlock network 48 can then be connected to adjoining transfer processors or transfer interlocks. The tooling level 12 is connected with the data collection level 14 via an ethernet network 55. Also on this network is a data collection processor 56, which is connected through a plant ethernet 58 to a programmable device support server 60, and an FIS terminal 62.

Figure 2:
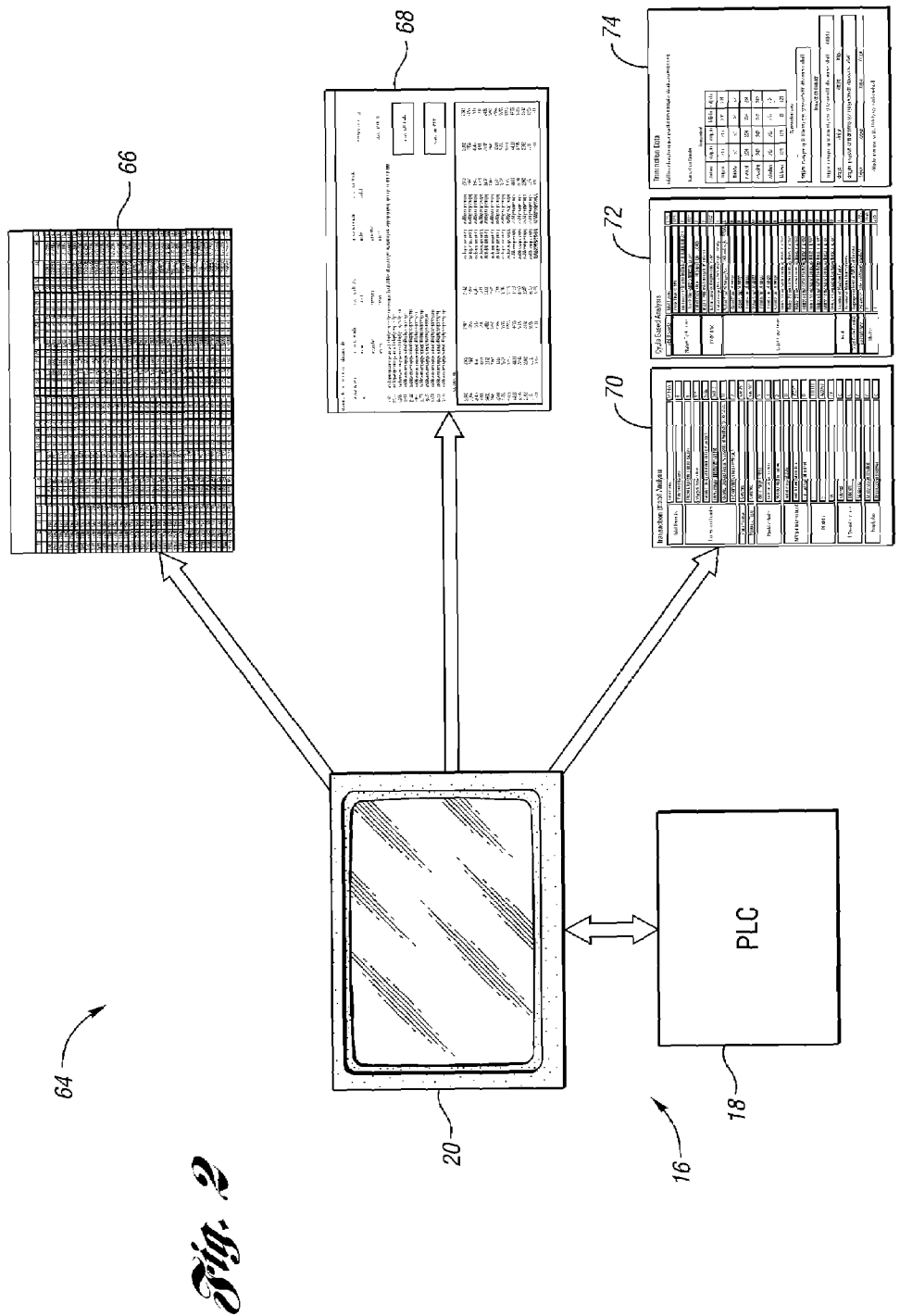
FIG. 2 is a schematic diagram illustrating the system for validating data shown in FIG. 1, and a method in accordance with the present invention.

FIG. 2 shows a schematic diagram 64 illustrating the system 16 and a method in accordance with an embodiment of the present invention. As shown in FIG. 2, the processing arrangement 20 transfers data to and from the PLC 18. During operation of the machine arrangement 22—see FIG. 1—data related to the operation of the machine arrangement 22 is captured and output into a convenient format, such as a data table 66. It is worth noting that operation of the machine arrangement 22 is just one way in which data indicative of operation of the machine arrangement 22 can be generated. For example, PLC data can be simulated, rather than being output during actual machine operation. One example of simulating PLC operations is described in U.S. Pat. No. 6,442,441 issued to Walacavage et al. on 27 Aug. 2002, which is hereby incorporated herein by reference.

Once the data is captured, an algorithm is executed using at least some of the data in the data table 66. The algorithm, represented by the informational screen 68 shown in FIG. 2, may be programmed into a memory of the processing arrangement 20, and executed by a processor also contained therein. Alternatively, the algorithm could reside in one or more other locations, that are in communication with the processing arrangement 20, or otherwise have access to the data in the data table 66.

The algorithm can include one or more rules that are applied to the recorded or captured data in the data table 66 to determine the validity of the data entries. Application of the algorithm in accordance with embodiments of the present invention can lead to the generation of an output that provides an indication of the validity of the data collected during operation of the machine arrangement. For example, the output can take the form of reports 70, 72, 74 shown in FIG. 2, which respectively represent a transaction based analysis, a cycle based analysis, and an analysis of a prove-out run. The prove-out run is a particular process sequence run on a machine at a tool manufacturer's facility in an auto repeat mode for an extended period in order to identify and fix machine bugs or issues prior to plant floor installation.

FIG. 3 shows the details of the data table 66 schematically illustrated in FIG. 2. As shown in FIG. 3, the data table 66 includes 35 columns identified in numerical order in a top row 76. The first 32 columns represent status registers, each of which represents a different status of the operation of a machine arrangement, such as the machine arrangement 22. FIG. 4 provides one example of what each of these status registers can represent. Of course, a PLC, such as the PLC 18, may be programmed to capture data related to machine arrangement operation parameters that are different from those illustrated in FIG. 4. For example, although 32 different status registers are used in the example described above, more or less than 32 registers may be used.

In addition to the 32 status registers, the data table 66—see FIG. 3—also includes a time stamp in column 33, a date stamp in column 34, and an additional parameter in column 35. In the embodiment shown in FIG. 3, this additional parameter indicates the number of cycles that have occurred since the last time the data capture was started. Therefore, the number in column 35 will remain constant until data capture is ended and restarted. This provides an indication of where an interruption has occurred in the data capture process.

The algorithm applied as part of embodiments of the present invention, and represented schematically by the screen 68 shown in FIG. 2, can include one or more rules applied to the data in the data table 66 to determine its accuracy. As an example, a first rule might be applied to at least two of the data entries in a single register to determine if the data in the single register violates the first rule. Using column 1, or the first data register, shown in FIG. 3, application of this type of rule can be explained. As shown in FIG. 4, the first data register is a transaction counter. The transaction counter is an automatically generated identification number for each of the data entries. In a general sense, each of the data entries in the first register should be unique, since the counter should increment with the occurrence of each new transaction. Therefore, one rule might include a criterion that each of the data entries in the first data register should be unique, otherwise the data in the first register will violate the rule.

A more specific version of this same rule might include a criterion that each of the data entries in the first register should be sequential over time. Thus, a violation of this rule would occur not only if there were duplicate entries in the first register, but also if any of the numbers jumped from one entry to the next more than between any other entries. An examination of the data in the first register of the data table 66 shown in FIG. 3 indicates that the transaction counter 1604 is repeated, and there is no transaction 1605. Thus, application of an algorithm that included one of the rules described above, would lead to an output indicating that at least some of the data in the data table 66 is inaccurate.

Other rules may be applied to the data found in a single register in the data table 66, to further provide an indication of the validity or accuracy of the data that has been collected. For example, some operation parameters may be expected to change over time. For example, register number 8 represents a transfer/index cycle time—see FIG. 4. Although all of the entries in register number 8 in the data table 66 are the same, it may be expected that over a much larger number of data entries, this number would change, since the transfer/index cycle time, although consistent, would be expected to vary if a large enough number of data entries are captured. Thus, an algorithm used in a method of the present invention may include a rule having a criterion that at least some of the data entries in a single register, such as the register number 8, should be different from at least some of the other data entries in the same register.

As noted above, the present invention can take advantage of the fast processing speeds of modern electronic processors such that tens of thousands of data entries in a single register may be quickly examined to determine if they are all the same. If a rule such as this is applied to the data in a single register, the rule may be violated if all of the data entries in that single register are determined to be exactly the same. A variation of this rule may be used wherein there is a criterion that the data in predetermined number of consecutive entries in the register should not be the same. A rule such as this could be used when analyzing data where relatively constant variation is to be expected.

Another type of rule that can be applied to the data in a single register, is a rule that examines the data for a predetermined value that should periodically occur. For example, if the data entries in a particular data register occur over a number of operation cycles, and the data is expected to reset to the predetermined value at the start of each new operation cycle, a rule can be programmed into the algorithm to determine conformance. For example, the rule can include a criterion that the data entry at the start of each new operation cycle must equal the predetermined value, or the rule is violated. Although these rules have been described individually, it is understood that an algorithm that is executed in accordance with embodiments of the system and method of the present invention can include many such rules applied throughout the execution of the algorithm to examine the validity of the data according to a plurality of different criteria.

In addition to analyzing the data in a single register, which, in the embodiment shown in FIG. 3, means the data in a single column, algorithms executed in accordance with embodiments of the system and method of the present invention can also analyze data across a number of different registers, for example, at the same time of operation of the machine. One such rule may examine the data entries in at least two different registers, where each of the data entries was captured at the same time of operation of the machine. Using the data entries shown in the data table 66 in FIG. 3, one example of this can be seen at the time 16:05:34 on Jan. 27, 2007. Referring to the chart 78 shown in FIG. 4, it is shown that position (POS.) number 5—i.e., status register 5 or column 5 in FIG. 3—represents an indicator of equipment status. For example, the number "256" shown in the register number 5 in the data table 66 may represent that the machine is operating in an automatic mode. This entry can be compared to the data entry in another register at the same time and date stamp—e.g., data register 16, which indicates a machine fault.

An algorithm executed in accordance with embodiments of the present invention may include a criterion that the machine operating mode should not be "automatic" when a fault status for the machine indicates the presence of a machine fault. Therefore, application of such a rule to the data table 66 shown in FIG. 3 would lead to a violation of the rule, indicating that at least some of the data may be invalid. Other rules may combine an analysis of data entries in two different registers with an analysis of data entries within one of the registers. For example, a rule may state that once a machine fault is indicated during a machine operating cycle, the fault should remain indicated until the cycle ends—at which point the machine fault indicator may be reset. Thus, a transaction and/or cycle counter in one register may be analyzed over time within the one register to determine when a new cycle begins, and simultaneously, another register indicating a machine fault may be analyzed vis-à-vis the transaction/cycle counter register to determine if the rule is violated.

Another example of a rule that can be used in the algorithm is one in which a repeated fault code is considered a violation. Specifically, if a certain fault code occurs, and then is reset, it should not occur again, at least within some predetermined amount of time. If it does reoccur, the rule is violated and at least some of the data considered invalid. When one or more rules are violated, further investigation of the data by the application of additional rules, or by analysis by a subject matter expert, can be used to lead to a final determination of which of the data are inaccurate. To the extent that a subject matter expert is used, the focus can be very narrow, given that the execution of the algorithm will have pinpointed at least one specific error.

As described above, execution of the algorithm in accordance with embodiments of the system and method of the present invention can lead to output in a number of different forms which can be useful for determining the validity of the data being analyzed. FIG. 5 shows a transaction based analysis report 70 and a cycle based analysis report 72, which are illustrated schematically in FIG. 2. Each of these reports provides different information based on the application of the various rules that may be programmed into the executed algorithm. The two reports 70, 72 shown in FIG. 5, correspond to the same data collection from the same machine operation. The total records in the transaction based analysis are 561,855, whereas the total cycles in the cycle based analysis are only 3,195. This is because a cycle may be defined as a specific machine task, and a transaction defined as an instance of data exchange between a plant floor controller, such as the PLC 18, and an upper level controller, such as the line supervisory PLC 50. Thus, there are many transactions which occur in each cycle.

Described above is a rule that was applied to data in a single register to determine if the data was properly reset at the end of a cycle. A similar rule can be applied to a transaction counter, and this is illustrated in the output shown in the report 70. In particular, it is shown that there was an improper rollover from 9999 to 0 in 111 transactions. Moreover, it is also shown that in 5,622 instances, the counter changed but the data did not—at least the data did not change within a 58 second time frame. Each of these instances indicate that at least some of the data captured in a corresponding data table is invalid.

As described above, additional algorithms or human intervention can be applied to determine which of the data are invalid and to determine the root cause of the error. Similar information is shown in the report 72 with regard to cycles, rather than transactions. With regard to the cycle based analysis, there were no improper rollovers and nothing in the other portions of the data report to indicate a cycle based error. Of course, the reports 70, 72 are just two examples of outputs that can be generated by executing an algorithm in accordance with embodiments of the system and method of the present invention.

One of the applications of the present invention is to validate the data generated by a newly built production machine tool prior to its being delivered to a production facility. FIG. 6 shows a flow chart 80 that indicates some of the steps involved with such a process, and further indicates the savings and advantages of applying the present invention to this process. Initially, at step 82, the machine tool is built. At step 84, logic is loaded into a machine controller, such as a PLC, which is connected to the machine. Such logic may include: 1) machine tool control and 2) machine tool monitoring logic.

The machine monitoring system data capture is configured in step 86. This step is in accordance with the present invention, and is not used in conventional machine tool certification processes. At step 88, debugging occurs, which now has an additional subpart in accordance with the present invention. In conventional systems, the machine tool control and machine tool monitoring would be debugged at step 88, but now, in addition, the MMS data analyzer is used to debug the machine monitoring system configured at step 86.

At this point in the process, two time consuming and costly steps are eliminated as a result application of the present invention. At step 90, shown in phantom, the installation of a factory information system at the tool builder's location would occur. As shown in FIG. 1, an FIS may include one or more data collection processors, programmable device support servers, and FIS terminals. As applied to a machine tool build, each of these devices would be installed at the machine builder's facility, and then connected through a network, such as an ethernet. In addition, the entire system would then need to be connected to the data capture system, shown at the tooling level 12 in FIG. 1. After installation of such an FIS system, the machine monitoring system would then be debugged using the FIS system—see step 92 shown in phantom. Thus, although applications of the present invention include the additional step of configuring the MMS data capturing at step 86, and the subsequent debugging at step 88, the addition of these steps provides for the elimination of much more complex and time consuming steps 90 and 92.

At step 94, the buy-off process takes place, where the machine tools are exercised to demonstrate their capability. This process may include such things as E-stop testing, a prove-out run test, dimensional testing, and welding testing. During this process, the MMS data capture and analyzer can be used during the 2500 cycle runoff to generate reports, such as the reports 70, 72 shown in FIG. 5, and to determine the accuracy of the data being captured. At step 96, after the machine tool has been certified, the final tool purchase is approved and the machine is delivered to the production facility.

Although the installation of the FIS system and the subsequent debugging of that system has been eliminated from the process illustrated in FIG. 6, the machine tool will be integrated with a factory information system when it arrives at the production facility. Therefore, some integration is necessary to ensure that the information processed in the factory information system is accurate. In order to facilitate this, the present invention contemplates the use of a "playback system" illustrated schematically in the diagram 98 shown in FIG. 7. As described in detail above, one of the features of the present invention is that data related to machine operation can be captured, recorded and analyzed. This data may be in the form of data files 100 shown in FIG. 7.

These data files can then be transferred to a "playback module 102", which may be a processing arrangement including one or more electronic processors and memories. The playback module 102 is connected to a PLC or other logic engine 104, which may have programmed into it software, such as "PLC-5", "SoftLogix", or other commercially available or custom software. The information from the playback module 102 can be fed into PLC 104, for example, using Object Linking and Embedding for Process Control (OPC). Information from the PLC 104 can then be transferred to a factory information system 106 that is already installed at a production facility, where it will be used with the machine tool once it arrives from the machine builder's location. In this way, operation of the machine tool is simulated without a direct connection between the machine tool and the FIS.

Using the playback module 102, the same data that was used to generate reports, such as the reports 70, 72 shown in FIG. 5, can be used by the factory information system 106 to generate a second set of reports. These two sets of reports can then be directly compared to determine if the data capture from the operation of the machine, for example the machine arrangement 22 shown in FIG. 1, is being accurately processed by the factory information system 106. The present invention allows this determination to be made without the need to install the factory information system at the tool builder's location, thus providing a significant time and cost savings.

While the best mode for carrying out the invention has been described in detail, those familiar with the art to which this invention relates will recognize various alternative designs and embodiments for practicing the invention as defined by the following claims.

What is claimed:

1. A method for validating data for a machine arrangement using a data collection and analysis system including a controller operatively connected to the machine arrangement and configured to output data related to operation of the machine arrangement, and further including a processing arrangement having a processor and a memory, the processing arrangement being programmed with an algorithm including a plurality of rules for determining validity of the data output from the controller, the method comprising:

generating data indicative of operation of the machine arrangement;

capturing the generated data, the captured data including a plurality of registers, each of the registers being filled at predetermined time intervals with data related to operation of the machine arrangement, thereby generating a data set indicative of the machine arrangement operation over time and having a plurality of data entries for each register, each of the entries being associated with a certain time during the machine arrangement operation;

executing the algorithm from the processing arrangement using at least some of the captured data to determine validity of the data captured, the algorithm including at least one of the following steps:

applying a first rule to at least two of the data entries in a single register to determine if the data in the single register violate the first rule, or applying a second rule to data entries associated with the same time of the machine arrangement operation for at least two different registers to determine if the data in the at least two registers violate the second rule; and indicating that at least some of the data in the data set is invalid when at least one of the rules is violated.

2. The method of claim 1, wherein the single register includes an automatically generated respective identification number for each of the data entries, the first rule including a criterion that each of the data entries in the single register should be unique, the data from the single register violating the first rule when the data from the single register includes duplicate entries.

3. The method of claim 2, wherein the first rule further includes a criterion that the data entries in the single register should be sequential over time, the data from the single register violating the first rule when any two consecutive data entries in the single register are not sequential.

4. The method of claim 1, wherein the single register includes data capable of changing over time, the first rule including a criterion that at least some of the data entries in the single register should be different from at least some of the other data entries in the single register, the data from the single register violating the first rule when all of the data entries from the single register are the same.

5. The method of claim 1, wherein the single register includes data capable of changing over time, the first rule including the criterion that the data in a predetermined number of consecutive entries in the single register should not be the same, the data from the single register violating the first rule when at least the predetermined number of consecutive entries in the single register are the same.

6. The method of claim 1, wherein the data indicative of operation of the machine arrangement is generated over a plurality of operation cycles, the single register including data over a plurality of the operation cycles, the first rule including a criterion that a respective data entry in the single register should reset to a predetermined value at the start of each new operation cycle, the data from the single register violating the first rule when the data entry associated with the start of a new operation cycle is not the predetermined value.

7. The method of claim 1, wherein one of the at least two different registers includes data indicating an operating mode for the machine arrangement, and another of the at least two different registers includes data indicating a machine arrangement fault status, the second rule including a criterion that the machine arrangement operating mode should not be "automatic" when the machine arrangement fault status indicates the presence of a machine arrangement fault, the data from the at least two different registers violating the second rule when the data from the one of the at least two different registers indicates that the machine arrangement is operating in the "automatic" mode and the data from the other of the at least two different registers indicates the presence of a machine arrangement fault.

8. The method of claim 1, further comprising generating a first output indicative of whether at least some of the data in the data set is invalid based on the execution of the algorithm.

9. The method of claim 8, further comprising:
using the captured data for operation of a machine management system in which operation of the machine arrangement is simulated;
generating a second output from the machine management system indicative of the simulated operation of the machine arrangement; and
comparing the first and second outputs to indicate accuracy in the machine management system.

10. The method of claim 1, wherein the step of generating data indicative of operation of the machine arrangement includes at least one of operating the machine arrangement to generate the data, or simulating operation of the machine arrangement without operating the machine arrangement.

11. A method for validating data for a machine arrangement using a data collection and analysis system including a processing arrangement having a processor and a memory, the processing arrangement being programmed with an algorithm including a plurality of rules for determining validity of data associated with operation of the machine arrangement, the method comprising:
operating the machine arrangement;
collecting at predetermined time intervals data associated with a plurality of machine arrangement operation parameters, thereby generating a data set having a plurality of data entries associated with each of the machine arrangement operation parameters;
executing the algorithm from the processing arrangement using at least some of the collected data to determine validity of the data collected, the algorithm including application of at least one of a first rule or a second rule,
the first rule being applied to at least two of the data entries associated with a single one of the operation parameters to determine if the data associated with the single operation parameter conform to the first rule,
the second rule being applied to data entries associated with the same time of the machine arrangement operation for at least two different operation parameters to determine if the data associated with the at least two operation parameters conform to the second rule; and
indicating that at least some of the data in the data set is invalid when at least some of the data entries are nonconforming with at least one applied rule.

12. The method of claim 11, wherein the single operation parameter includes an automatically generated respective identification number for each of the data entries, the first rule including a criterion that the data entries associated with the single operation parameter should be sequential over time, the data associated with the single operation parameter being nonconforming with the first rule when the data associated with the single operation parameter includes duplicate entries.

13. The method of claim 11, wherein the data associated with the single operation parameter includes data capable of changing over time, the first rule including a criterion that at least some of the data entries associated with the single operation parameter should be different from at least some of the other data entries associated with the single operation parameter, the data associated with the single operation parameter being nonconforming with the first rule when all of the data entries associated with the single operation parameter are the same.

14. The method of claim 11, wherein operation of the machine arrangement occurs over a plurality of operation cycles, the single operation parameter including data over a plurality of the operation cycles, the first rule including a criterion that a data entry associated with the single operation parameter should reset to a predetermined value at the start of each new operation cycle, the data associated with the single operation parameter being nonconforming with the first rule when the data entry associated with the start of a new operation cycle is not the predetermined value.

15. The method of claim 11, wherein one of the at least two different operation parameters includes data indicating an operating mode for the machine arrangement, and another of the at least two different operation parameters includes data indicating a machine arrangement fault status, the second rule including a criterion that the machine arrangement operating mode should not be "automatic" when the machine arrangement fault status indicates the presence of a machine arrangement fault, the data associated with the at least two different registers being nonconforming with the second rule when the data associated with the one of the at least two different operation parameters indicates that the machine arrangement is operating in the "automatic" mode and the data associated with the other of the at least two different operation parameters indicates the presence of a machine arrangement fault.

16. The method of claim 11, further comprising generating a first output indicative of whether at least some of the data in the data set is invalid based on the application of the algorithm.

17. The method of claim 16, further comprising:
using the captured data for operation of a machine management system in which operation of the machine arrangement is simulated;
generating a second output from the machine management system indicative of the simulated operation of the machine arrangement; and
comparing the first and second outputs to indicate accuracy in the machine management system.

18. A system for validating data for a machine arrangement, comprising:
a controller operatively connected to the machine arrangement and configured to output data at predetermined time intervals related to operation of the machine arrangement; and
a processing arrangement operatively connected to the controller and including a processor and a memory, the processing arrangement being configured to receive into the memory data output from the controller, the data received being arranged into a plurality of registers, each of the registers including data entries associates with different machine arrangement operation times thereby forming a data set indicative of the machine arrangement operation over time and having a plurality of data entries for each register,
the processor being programmed with an executable algorithm for determining validity of the data output from the controller, the algorithm including at least one of a first rule or a second rule,
the first rule being applicable to at least two of the data entries in a single one of the registers to determine if the data in the single register violate the first rule,
the second rule being applicable to data entries associated with the same time of the machine arrangement operation for at least two different registers to determine if the data in the at least two registers violate to the second rule, the processing arrangement being further configured to provide output indicating that at least some of the data in the data set is invalid when at least one of the rules is violated.

19. The system of claim 18, wherein the single register includes an automatically generated respective identification number for each of the data entries, the first rule including a criterion that each of the data entries in the single register should be sequential over time, the data from the single register violating the first rule when any two consecutive data entries in the single register are not sequential.

20. The system of claim 18, wherein the single register includes data capable of changing over time, the first rule including a criterion that at least some of the data entries in the single register should be different from at least some of the other data entries in the single register, the data from the single register violating the first rule when all of the data entries from the single register are the same.

21. The system of claim 18, wherein the single register includes data capable of changing over time, the first rule including the criterion that the data in a predetermined number of consecutive entries in the single register should not be the same, the data from the single register violating the first rule when at least the predetermined number of consecutive entries in the single register are the same.

22. The system of claim 18, wherein operation of the machine arrangement occurs over a plurality of operation cycles, the single register including data over a plurality of the operation cycles, the first rule including a criterion that a respective data entry in the single register should reset to a predetermined value at the start of each new operation cycle, the data from the single register violating the first rule when the data entry associated with the start of a new operation cycle is not the predetermined value.

23. The system of claim 18, wherein one of the at least two different registers includes data indicating an operating mode for the machine arrangement, and another of the at least two different registers includes data indicating a machine arrangement fault status, the second rule including a criterion that the machine arrangement operating mode should not be "automatic" when the machine arrangement fault status indicates the presence of a machine arrangement fault, the data from the at least two different registers violating the second rule when the data from the one of the at least two different registers indicates that the machine arrangement is operating in the "automatic" mode and the data from the other of the at least two different registers indicates the presence of a machine arrangement fault.

24. The system of claim 18, wherein the processing unit is further configured to provide an output of the data received into the memory, the output being usable by a machine management system to simulate operation of the machine arrangement.

* * * * *